(12) United States Patent
Lin

(10) Patent No.: US 7,540,640 B2
(45) Date of Patent: Jun. 2, 2009

(54) ILLUMINATING WARNING LAMP

(76) Inventor: Yung-Fa Lin, 6F., No. 2, Lane 163, Xinyi Rd., Banqiao City, Taipei County 220 (TW)

( * ) Notice: Subject to any disclaimer, the term of this patent is extended or adjusted under 35 U.S.C. 154(b) by 0 days.

(21) Appl. No.: 12/167,577

(22) Filed: Jul. 3, 2008

(65) Prior Publication Data

US 2009/0097266 A1    Apr. 16, 2009

(30) Foreign Application Priority Data

Oct. 15, 2007    (TW) .............................. 96217226 U

(51) Int. Cl.
*B60Q 1/00* (2006.01)
(52) U.S. Cl. ........................ 362/485; 362/540; 362/543; 362/544; 340/468; 340/472
(58) Field of Classification Search ................ 362/227, 362/236, 240, 241, 244, 245, 249.01, 249.02, 362/470, 473, 477, 478, 481, 485, 487, 499, 362/505, 506, 540–546, 800; 340/431, 468, 340/471, 472, 473, 475, 479, 932.2
See application file for complete search history.

(56) References Cited

U.S. PATENT DOCUMENTS

| | | | | |
|---|---|---|---|---|
| 3,457,397 A | * | 7/1969 | Tindall | 362/505 |
| 5,430,625 A | * | 7/1995 | Abarr et al. | 362/485 |
| 6,422,728 B1 | * | 7/2002 | Riggin | 362/540 |
| 6,543,917 B1 | * | 4/2003 | Berlinghof | 362/485 |
| 6,808,300 B2 | * | 10/2004 | Fellhauer | 362/541 |
| 7,048,419 B1 | * | 5/2006 | Rodriguez | 362/485 |

* cited by examiner

*Primary Examiner*—Hargobind S Sawhney
(74) *Attorney, Agent, or Firm*—Rabin & Berdo, P.C.

(57) ABSTRACT

An illuminating warning lamp includes a first light source and a second light source assembled on a lamp socket. An irradiation direction of the first light source and that of the second light source form an angle of 90 degrees with respect to each other. Additionally, a first lamp casing for encapsulating the first light source is further formed with a through hole at one side thereof, and a second lamp casing corresponding to the second light source is assembled within the through hole. After the first and second light sources are both driven to emit lights, the lamp simultaneously emits warning lights and illumination light.

10 Claims, 4 Drawing Sheets

ILLUMINATING WARNING LAMP

BACKGROUND OF THE INVENTION

1. Field of the Invention

The present invention relates to an illuminating warning lamp assembled on a vehicle, and more particularly to an illuminating warning lamp with a light source for warning and a light source for illumination assembled within the same lamp socket, so as to simultaneously emit warning lights and illumination lights.

2. Related Art

Generally, a common vehicle utilizes several warning lamps and illumination lamps assembled on the periphery of the vehicle body when being used at night, for example, traveling or parking beside the road for a while at night. The warning lamps are provided for being viewed by a driver of a vehicle there behind, so that the driver keeps alert; whereas the illumination lamps are used for illuminating the road to ensure the safety of the vehicle when being used at night.

However, since the usage and irradiation direction of the warning lights are different from that of the illuminating lights, the required luminance also varies accordingly. Generally, the warning light is irradiated toward the rear. In order to avoid directly irradiating the driver of the approaching vehicle there behind to blur the driver's vision, the luminance of the warning lights is low and the color thereof is mostly read, yellow and the like, so as to enable the driver of the approaching vehicle there behind to see the warning lights of the front vehicle at a certain distance away and to make corresponding responses in advance. The illumination lights are used to irradiate the ground in front of the vehicle to enable the driver to see the road conditions clearly and to make proper responses. Therefore, the illumination lights are designed to be relatively bright in terms of the luminance and the color thereof is mostly canary yellow or white.

Currently, as for the design of the lamp casing of most warning lamps and illumination lamps available from the market, since the warning lamp needs to reduce the light-emitting luminance, the lamp casing is designed with a plurality of refractive surfaces on an inner surface thereof, so that the lights are not directly transmitted outwards, whereas the lamp casing of the illumination lamp reduces the luminance loss by designing many light-condensing bars on the lamp casing or by adopting a completely planar configuration, so that the lights are more concentrately transmitted. Such two lamps are designed in total different manners, and they are mostly designed separately, which causes much inconvenience in both installation and maintenance, especially for some large scale vehicles such as touring cars, freight cars, trucks, or even sand and stone carriages. Since the vehicle body is rather long and the driver has many dead angles of the field of vision, the vehicle is commonly disposed with a lot of warning lamps at both sides. However, these lamps sometimes are also used for illumination. An insufficient luminance makes the driver unable to see the roadside conditions clearly while reversing; whereas an excessively high luminance causes the driver of the approaching vehicle there behind unable to see the front road conditions clearly, thereby resulting in the driving danger for both parties.

SUMMARY OF THE INVENTION

In view of the disadvantages of a single warning lamp or a single illumination lamp in usage, the inventor of the present invention has designed a novel illuminating warning lamp based on careful researches and many years' experience in this field.

The present invention is mainly directed to an illuminating warning lamp with both warning and illumination effects, so as to raise the driving safety during traveling.

In order to achieve the above objective, an illuminating warning lamp of the present invention is provided, which includes a lamp socket, a first light source, a first lamp casing, a second light source, a second lamp casing, and a fixing ring. First, a first light-source socket and a second light-source socket are assembled on the lamp socket. Then, the first light source is assembled on the first light-source socket, and the second light source is assembled on the second light-source socket, such that an irradiation direction of the first light source forms an angle of 90 degrees with respect to that of the second light source. Finally, the first lamp casing is assembled on the lamp socket, such that the first and second light sources are both encapsulated therein. Additionally, a through hole is formed at one side of the first lamp casing, and the second lamp casing corresponding to the second light source is assembled within the through hole. After the first and second light sources are both driven to emit lights, since the first lamp casing is formed with a plurality of refractive surfaces thereon, the lights of the first light source have a reduced luminance after transmitting through the first lamp casing, which serve as the warning light. Since the second lamp casing is in a perfectly smooth configuration, the lights of the second light source have a high luminance after transmitting through the second lamp casing, which serve as the illumination lights. Therefore, in the usage of the present invention, the warning lights and the illumination lights are emitted simultaneously, so as to greatly enhance the traveling safety. In actual applications, the illuminating warning lamp of the present invention is assembled at a proper position on a surface of the vehicle body, and the first and second light sources are electrically connected to a power supply of the vehicle respectively or simultaneously. Additionally, the irradiation direction of the second light source is adjusted to be toward the ground. Therefore, the effect of providing lights for warning a vehicle there behind and the effect of illuminating the roads around the vehicle body both can be achieved, so as to enhance the driving safety during traveling.

BRIEF DESCRIPTION OF THE DRAWINGS

The present invention will become more fully understood from the detailed description given herein below for illustration only, which thus is not limitative of the present invention, and wherein.

DETAILED DESCRIPTION OF THE INVENTION

Figure 1:
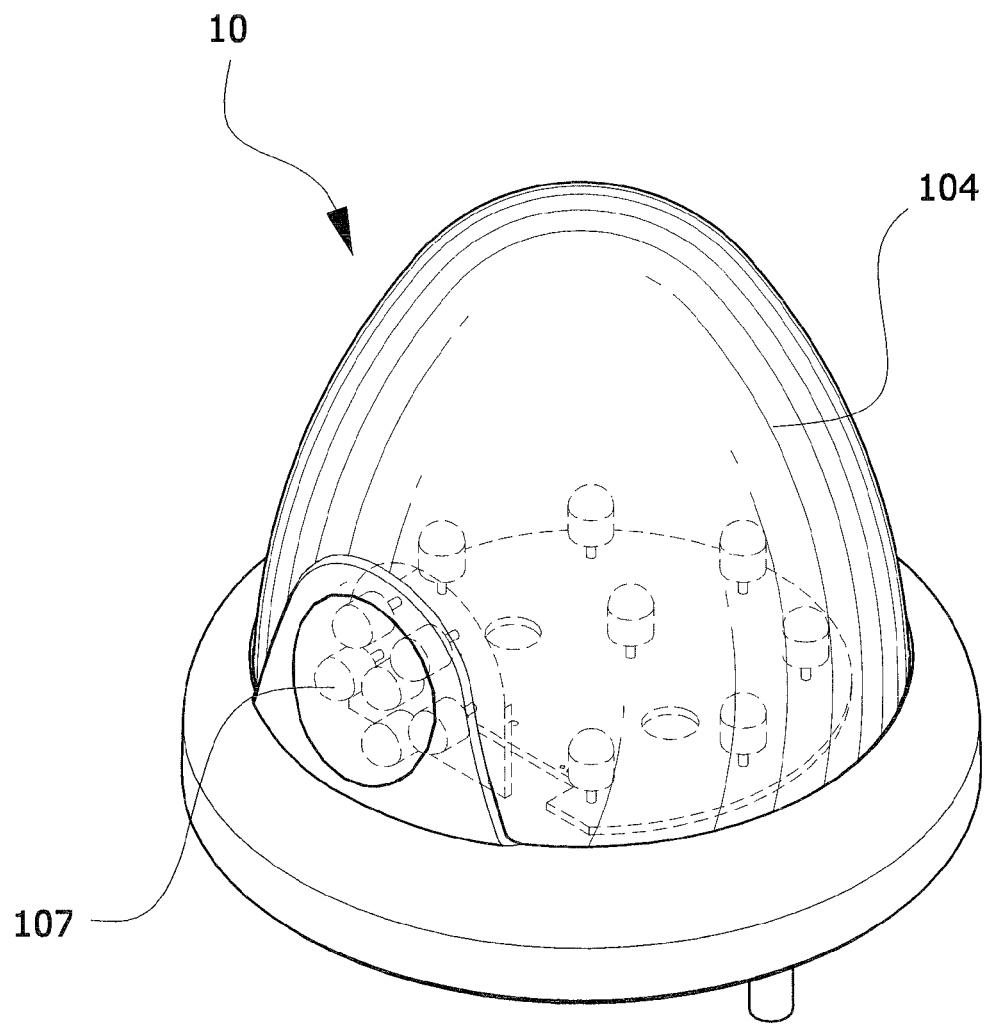
FIG. 1 is a three-dimensional assembled view of a preferred embodiment of the present invention.

FIG. 1 is a three-dimensional assembled view of a preferred embodiment of the present invention. Referring to FIG. 1, when viewed from the front side of an illuminating warning lamp 10 of the present invention, a first lamp casing 104 and a second lamp casing 107 can be seen, which have different colors. The first lamp casing 104 is formed with a plurality of continuous refractive surfaces on a surface thereof. Two separate light sources are disposed inside the illuminating warning lamp 10. The two light sources may be electrically connected to a power supply of the car separately or electrically connected to the same power supply simultaneously. A switch may be further disposed to control the two light sources to emit lights separately or simultaneously. The lights emitted by the first lamp casing 104 serves as the warning lights, which have a low luminance and thus avoid the dizziness problem of a driver of a vehicle there behind and prevent the driver from seeing vehicles thereabout unclearly to result in traffic accidents. Additionally, the lights emitted by the second lamp casing 107 serve as illumination lights and have a high luminance, which thus are irradiated toward the ground. Since some large scale vehicles such as touring cars, freight cars, trucks, or even sand and stone carriages are rather long and adds more dead angles of the field of vision to the drivers when driving at night, the illumination lights of the present invention enable the drivers of those large scale vehicles to see road conditions clearly including whether any vehicle is approaching while driving or reversing, thereby greatly enhancing the traveling safety of the vehicle at night.

Figure 2:
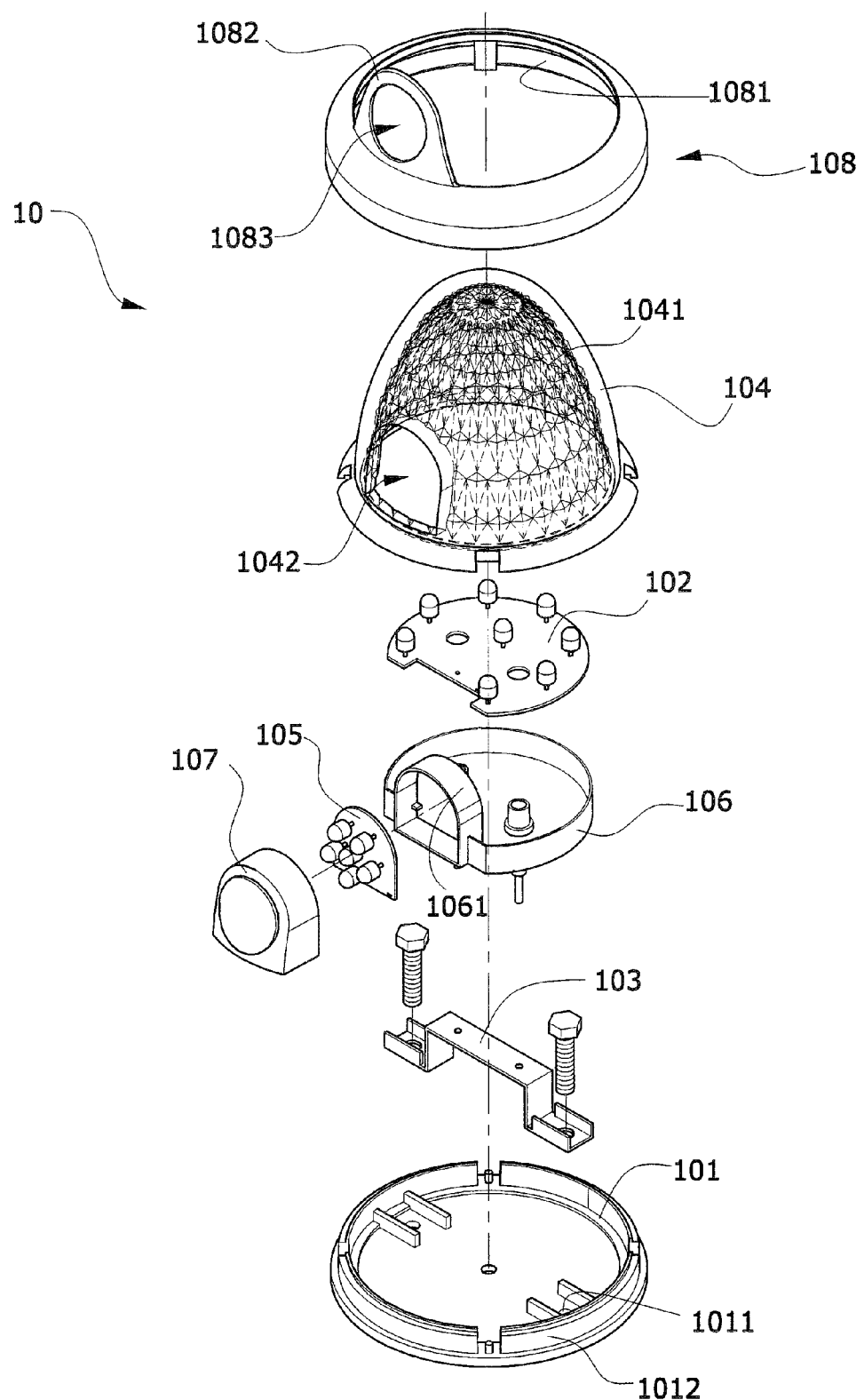
FIG. 2 is a three-dimensional exploded view of the preferred embodiment of the present invention.

FIG. 2 is a three-dimensional exploded view of the preferred embodiment of the present invention. Referring to FIG. 2, the above illuminating warning lamp 10 mainly includes a lamp socket 101, a first light source 102, a first lamp casing 104, a second light source 105, a second lamp casing 107, and a fixing ring 108. The lamp socket 101 is formed with a plurality of fixing holes 1011 and a fixing ring groove 1012, for fixing other relevant members. The first light source 102 is assembled on a first light-source socket 103 and the first light-source socket 103 is assembled within the fixing holes 1011 at a front side of the lamp socket 101, such that an irradiation plane of the first light source 102 is parallel to the front side of the lamp socket 101. Therefore, the first light source 102 emits lights toward the front side of the lamp socket 101. Additionally, the first light-source socket 103 is inverted T-shaped. The first light source 102 is assembled at a protruding portion of the first light-source socket 103 to increase the height of the first light source 102. Moreover, the first light source 102 is formed by a plurality of LEDs, and the generated heats are dissipated through an aperture formed between the first light-source socket 103 after being raised in height and the lamp socket 101. The first lamp casing 104 is assembled within the fixing ring groove 1012 of the lamp socket 101, for encapsulating the first light source 102, and the first lamp casing 104 is formed with a plurality of refractive surface 1041 thereon, for reducing the luminance of the lights emitted by the first light source 102. Additionally, the first lamp casing 104 is formed with a through hole 1042 at one side thereof. The second light source 105 is assembled on a second light-source socket 106, and the second light-source socket 106 is ring-shaped and assembled on a periphery of the first light-source socket 103. Additionally, the second light-source socket 106 is formed with a fixing portion 1061 at one side thereof, for securing the second light source 105. The second light source 105 is also formed by a plurality of LEDs. After being assembled, an irradiation plane of the second light source 105 forms an angle of 90 degrees with respect to that of the first light source 102. The second lamp casing 107 is assembled within the through bole 1042 of the first lamp casing 104, for encapsulating the second light source 105. The second lamp casing 107 is configured into perfectly smooth to enhance the luminance of the lights emitted by the second light source 105. The fixing ring 108 is used for encapsulating an outer ring edge assembled on the lamp socket 101 and used for fixing relative positions among the first lamp casing 104, the second lamp casing 107, and the lamp socket 101. Additionally, the fixing ring 108 is formed with a ring recess 1081 on a periphery thereof, for covering a periphery of the lamp socket 101. The fixing ring 108 is formed with a stopping plate 1082 at one side thereof. The stopping plate 1082 is further formed with a through hole 1083, for the lights of the second light source 105 to smoothly penetrate through when encapsulating the second lamp casing 107.

Figure 3:
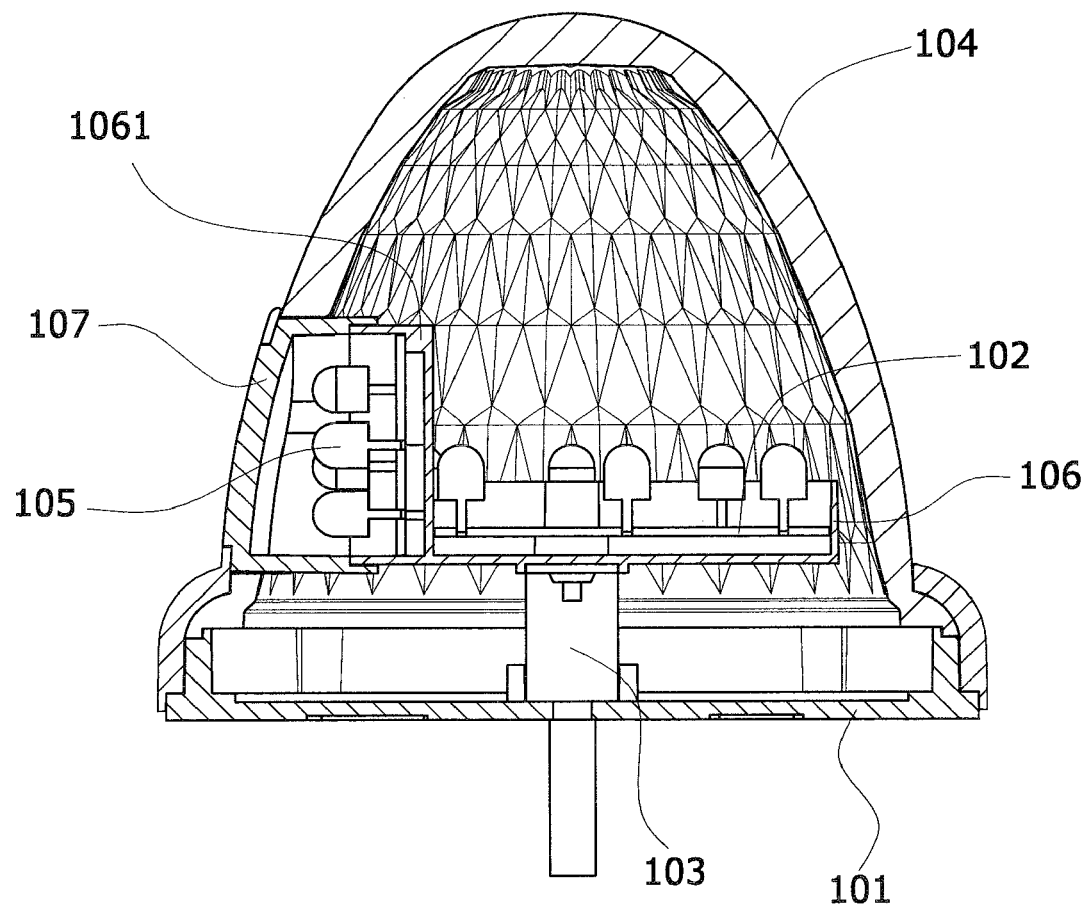
FIG. 3 is a cross-sectional view of the preferred embodiment of the present invention.

FIG. 3 is a cross-sectional view of the preferred embodiment of the present invention. Referring to FIG. 3, after the assembling process is completed, since the first light source 102 is assembled on the inverted T-shaped first light-source socket 103, the protruding portion of the first light-source socket 103 increases the height to the lamp socket 101, so that the heat-dissipation space of the first light source 102 is enlarged through the aperture formed between the first light-source socket 103 and the lamp socket 101 when the first light source 102 emits lights. When the second light source 105 is fixed on the periphery of the first light-source socket 103 by using the second light-source socket 106, the fixing portion 1061 of the second light-source socket 106 forms an angle of 90 degrees with respect to the first light source 102, such that the angle between the lights emitted by the first light source 102 and that emitted by the second light source 105 is also 90 degrees. After penetrating through the first lamp casing 104 and the second lamp casing 107 in different colors and designs, the lights emitted by the first light source 102 and that emitted by the second light source 105 become the warning lights and the illumination lights with different luminances respectively.

Figure 4:
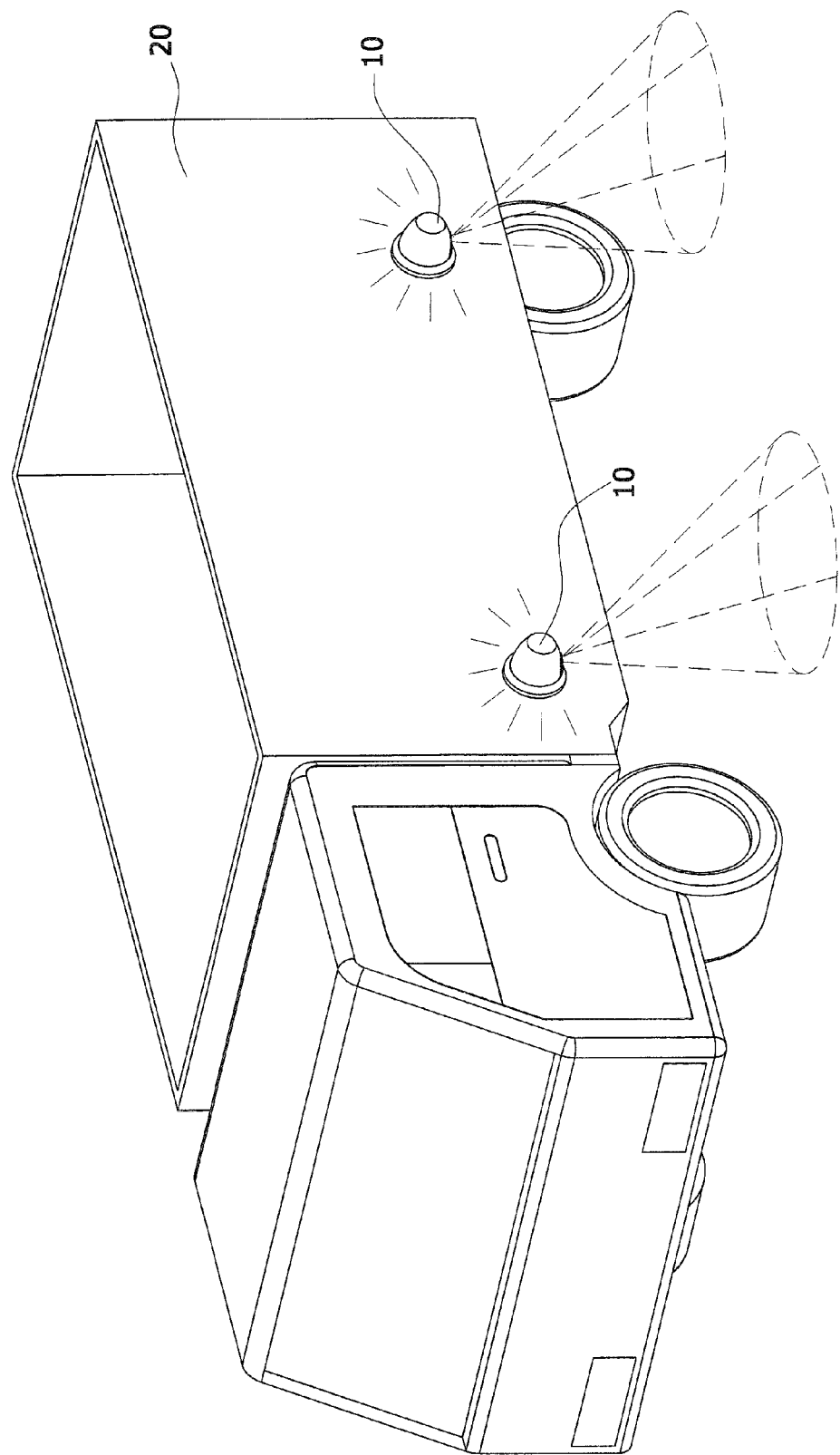
FIG. 4 is a schematic view of an installation of the preferred embodiment of the present invention.

FIG. 4 is a schematic view of an installation of the preferred embodiment of the present invention. Referring to FIG. 4, when the illuminating warning lamp 10 of the present invention is assembled on a common vehicle, for example, a freight car, they are assembled on the lower periphery of the vehicle body 20 and spaced apart from each other by an equal distance. The lights of the first light source 102 are used to form a warning region around the vehicle body 20, so as to provide a warning effect for the driver of the approaching vehicle there behind. In addition, the lights of the second light source 105 are irradiated on the ground and also form an illumination region around the vehicle body 20, which are provided not only for warning, but also for the vehicle driver to see the ground conditions around the vehicle clearly, thereby ensuring the safety while driving or reversing.

Accordingly, during the implementation of the present invention, the illuminating warning lamp is assembled at a proper position on a surface of the vehicle body, and the first and second light sources are electrically connected to the power supply of the vehicle. Additionally, the light irradiation direction of the second light source is adjusted to be toward the ground. Therefore, the effect of providing the light for warning the vehicle there behind and the effect of illuminating the roads around the vehicle body are both achieved. The illuminating warning lamp with both warning and illumination effects is indeed provided, so as to enhance the driving safety during traveling.

The above description is merely a preferred embodiment of the present invention, but not intends to limit the implementing scope of the present invention. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

In view of the above, the illuminating warning lamp of the present invention meets the patent requirements for "industrial applicability", "novelty", and "inventive step" as a utility model. Therefore, the applicant files an application for a utility model patent to the patent office according to the provisions of the patent law.

What is claimed is:

1. An illuminating warning lamp, assembled on a surface of a vehicle body and capable of simultaneously emitting lights for warning and illumination respectively, the illuminating warning lamp comprising:
    a lamp socket, formed with a plurality of fixing holes and a fixing ring groove;
    a first light source, assembled on one side of the lamp socket, wherein an irradiation plane of the first light source is parallel to the lamp socket;
    a first lamp casing, assembled within the fixing ring groove of the lamp socket, for encapsulating the first light source, wherein the first lamp casing is further formed with a through hole at one side thereof;
    a second light source, assembled on the lamp socket, wherein an irradiation plane of the second light source forms an angle of 90 degrees with respect to that of the first light source;
    a second lamp casing, assembled within the through hole of the first lamp casing, for encapsulating the second light source; and
    a fixing ring, encapsulating an outer ring edge assembled on the lamp socket, for fixing relative positions among the first lamp casing, the second lamp casing, and the lamp socket.

2. The illuminating warning lamp according to claim 1, wherein the first light source is assembled on a first light-source socket that is assembled within the fixing holes of the lamp socket.

3. The illuminating warning lamp according to claim 2, wherein the first light-source socket is inverted T-shaped, so as to assemble the first light source at a protruding portion of the first light-source socket.

4. The illuminating warning lamp according to claim 1, wherein the first light source is formed by a plurality of light emitting diodes (LEDs).

5. The illuminating warning lamp according to claim 1, wherein the second light source is assembled on a second light-source socket.

6. The illuminating warning lamp according to claim 5, wherein the second light-source socket is ring-shaped and is further formed with a fixing portion for securing the second light source.

7. The illuminating warning lamp according to claim 1, wherein the second light source is formed by a plurality of LEDs.

8. The illuminating warning lamp according to claim 1, wherein the first lamp casing is formed with a plurality of refractive surfaces thereon.

9. The illuminating warning lamp according to claim 1, wherein the second lamp casing is perfectly smooth.

10. The illuminating warning lamp according to claim 1, wherein the fixing ring is formed with a ring recess on a periphery thereof, for covering a periphery of the lamp socket; and the fixing ring is further formed with a stopping plate at one side thereof, and the stopping plate is further formed with a through hole.

* * * * *